United States Patent
Kanemaru et al.

(10) Patent No.: US 12,478,315 B2
(45) Date of Patent: Nov. 25, 2025

(54) BIOLOGICAL INFORMATION ANALYSIS DEVICE, BIOLOGICAL INFORMATION ANALYSIS METHOD, AND BIOLOGICAL INFORMATION ANALYSIS SYSTEM

(71) Applicant: MAXELL, LTD., Kyoto (JP)

(72) Inventors: Takashi Kanemaru, Tokyo (JP);
Yasuaki Nakamura, Tokyo (JP);
Akihiko Kandori, Tokyo (JP);
Tomohiko Mizuguchi, Kyoto (JP)

(73) Assignee: MAXELL, LTD., Kyoto (JP)

( * ) Notice: Subject to any disclaimer, the term of this patent is extended or adjusted under 35 U.S.C. 154(b) by 1099 days.

(21) Appl. No.: 17/418,153

(22) PCT Filed: Dec. 28, 2018

(86) PCT No.: PCT/JP2018/048457
§ 371 (c)(1),
(2) Date: Jun. 24, 2021

(87) PCT Pub. No.: WO2020/136870
PCT Pub. Date: Jul. 2, 2020

(65) Prior Publication Data
US 2022/0054078 A1    Feb. 24, 2022

(51) Int. Cl.
*A61B 5/00* (2006.01)

(52) U.S. Cl.
CPC ............ *A61B 5/4205* (2013.01); *A61B 5/742* (2013.01)

(58) Field of Classification Search
None
See application file for complete search history.

(56) References Cited

U.S. PATENT DOCUMENTS

| | | | |
|---|---|---|---|
| 2008/0306373 A1 | 12/2008 | Kandori et al. | |
| 2009/0030346 A1* | 1/2009 | Kojima | A61B 5/4205 600/590 |

(Continued)

FOREIGN PATENT DOCUMENTS

| | | |
|---|---|---|
| JP | 2008-301895 | 12/2008 |
| JP | 2009-213592 A | 9/2009 |

(Continued)

OTHER PUBLICATIONS

Notice of Reasons for Refusal issued for the corresponding Japanese Patent Application No. 2020-562269 dated Jun. 7, 2022, with English translation.

(Continued)

*Primary Examiner* — Jay B Shah
(74) *Attorney, Agent, or Firm* — Rimon P.C.

(57) ABSTRACT

The purpose of the present invention is to obtain a biological information analysis device, a biological information analysis method, and a biological information analysis system that enable more accurate determination of a swallowing motion. In order to attain the purpose, this biological information analysis device has: a swallowing motion assessment unit which assesses a user's motion by analyzing distance information and sound information that are obtained by measuring the motion and sound of the pharynx region; and a display unit, wherein the swallowing motion assessment unit is configured to output a first swallowing motion position that is assessed by analyzing the distance information and a second swallowing motion position that is assessed by analyzing the sound information, and the display unit is configured to display the distance information, the sound information, and the first swallowing motion position and the second swallowing motion position outputted by the swallowing motion assessment unit.

18 Claims, 8 Drawing Sheets

(56) References Cited

U.S. PATENT DOCUMENTS

| | | |
|---|---|---|
| 2009/0227907 A1 | 9/2009 | Kandori et al. |
| 2018/0242900 A1 | 8/2018 | Kuwa et al. |
| 2020/0022639 A1 | 1/2020 | Shimuta et al. |

FOREIGN PATENT DOCUMENTS

| | | |
|---|---|---|
| JP | 2012-200300 | 10/2012 |
| JP | 2016-185209 | 10/2016 |
| JP | 2017-38840 | 2/2017 |
| JP | 2018-130199 | 8/2018 |
| WO | 2017/033228 | 3/2017 |
| WO | 2018180778 A1 | 10/2018 |

OTHER PUBLICATIONS

International Search Report issued in corresponding International Patent Application No. PCT/JP2018/048457, dated Mar. 26, 2019, with English translation.

\* cited by examiner

SWALLOWING

SPEAKING

COUGHING

SWALLOWING

SPEAKING

COUGHING

FIG. 12

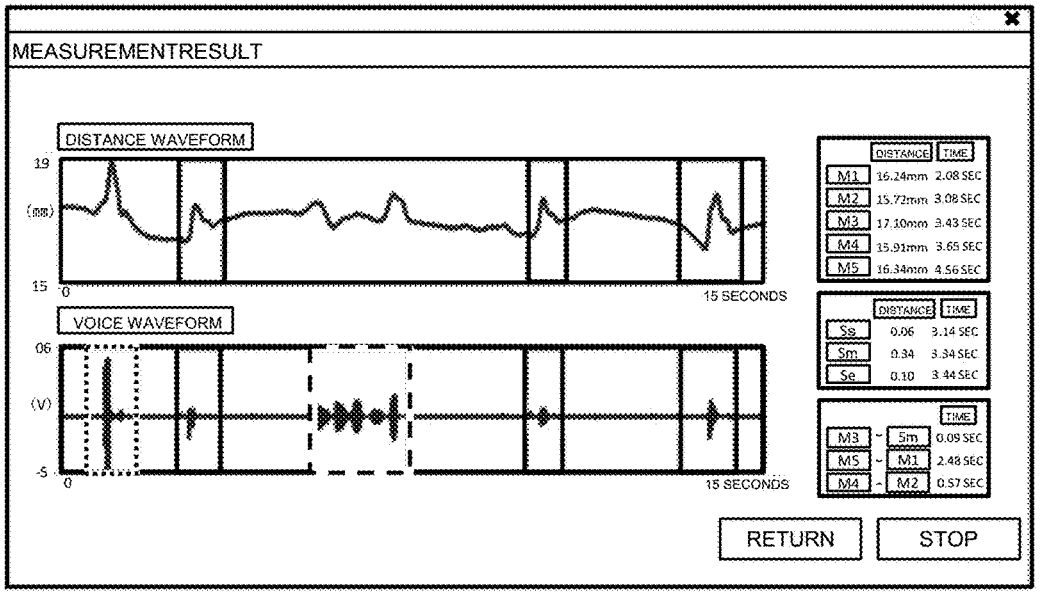

FIG. 13

| I SEVERE CONDITION<br><br>ORAL ROUTE UNAVAILABLE | Gr.1 | SWALLOWING IS DIFFICULT OR UNAVAILABLE, AND THERE IS NO ADAPTATION OF SWALLOWING TRAINING |
| --- | --- | --- |
| | Gr.2 | THERE IS ADAPTATION OF ONLY BASIC SWALLOWING TRAINING |
| | Gr.3 | ACCIDENTAL SWALLOWING IS REDUCED WHEN CONDITIONS ARE RIGHT, AND CONTACT TRAINING IS AVAILABLE |
| II MODERATE CONDITION<br><br>ORAL ROUTE AND SUPPLE-MENTAL NUTRITION | Gr.4 | FEEDING FOR PLEASURE IS AVAILABLE |
| | Gr.5 | PARTIAL ORAL FEEDING (ONE OR TWO MEALS) IS AVAILABLE |
| | Gr.6 | THREE-MEAL ORAL FEEDING IS AVAILABLE, BUT SUPPLEMENTAL NUTRITION IS NECESSARY |
| III MILD CONDITION<br><br>ONLY ORAL ROUTE | Gr.7 | THREE-MEAL ORAL FEEDING OF SWALLOWING FOOD IS AVAILABLE |
| | Gr.8 | THREE-MEAL ORAL FEEDING IS AVAILABLE EXCEPT FOR FOODS THAT ARE PARTICULARLY DIFFICULT TO SWALLOW |
| | Gr.9 | DAILY MEAL ORAL FEEDING IS AVAILABLE, AND CLINICAL OBSERVATION AND GUIDANCE ARE REQUIRED |
| IV NORMAL | Gr.10 | NORMAL FEEDING AND SWALLOWING ABILITY |

BIOLOGICAL INFORMATION ANALYSIS DEVICE, BIOLOGICAL INFORMATION ANALYSIS METHOD, AND BIOLOGICAL INFORMATION ANALYSIS SYSTEM

CROSS-REFERENCE TO RELATED APPLICATIONS

This application is the U.S. National Phase under 35 U.S.C. § 371 of International Application No. PCT/JP2018/048457, filed on Dec. 28, 2018, the entire content of which is hereby incorporated by reference.

TECHNICAL FIELD

The present invention relates to a biological information analysis device, a biological information analysis method, and a biological information analysis system.

BACKGROUND ART

A disorder in a swallowing function that is a function of feeding an alimentary bolus that is a target to be swallowed to the stomach from the oral cavity is caused by a decrease in a movement function or the like due to aging, a brain disorder, or the like. In a case where a swallowing disorder occurs, the alimentary bolus is mixed into the bronchiolar tube, the lung, or the like, and a lungs inflammation or the like is caused, and a high fever is developed, and thus, there are many cases in which the elderly with a weak physical strength are at risk of life.

As a method that is capable of accurately evaluating and grasping the swallowing disorder, swallowing contrast (video fluoroscopic examination of swallowing: VF) has been most commonly used. However, VF is an examination that may cause accidental swallowing, suffocation, or the like, and thus, requires attention. In addition, an X-ray illumination device that is a large-size device is required, and thus, an exposure problem, a time constraint problem, a cost problem, and the like occur.

In addition, as another method, swallowing endoscopic examination (video endoscopic examination of swallowing: VE) of an endoscope using a fiberscope is exemplified. VE is simple and convenient compared to VF, but a subject feels a sense of discomfort such as inserting a fiber from the nasal cavity, and a fiberscope device is required, and thus, VE is not capable of performing simple and convenient measurement and has not been sufficiently widely used. Further, when the alimentary bolus enters the pharynx and reaches the swallowing climax, the pharyngeal wall is closed, a space in the pharynx collapses, and a visual range of the endoscope becomes unclear, and thus, a time zone in which the swallowing organ moves most over a short period of time is not capable of being observed.

As a method for solving the problems of VF or VE described above, a method of simply and accurately sensing a swallowing disorder without applying a burden to a patient has been proposed.

For example, in Patent Document 1, an object is to provide a biological examination device that simply examines a swallowing disorder and displays the result thereof, and it is disclosed that the biological examination device includes a laryngeal region displacement detection unit detecting a displacement between two spots in a horizontal direction in a laryngeal region of a subject, a swallowing sound detection unit detecting a swallowing sound when the subject swallows, a display unit, and a processing unit instructing the display unit to display a waveform relevant to the displacement between two spots in the laryngeal region that is generated on the basis of information obtained from the laryngeal region displacement detection unit and a waveform relevant to the swallowing sound that is generated on the basis of information obtained from the swallowing sound detection unit, and a flexible retaining tool of the biological examination device has an independent configuration of a sensor fixing portion and a neck-wearing portion and has a structure in which the sensor fixing portion and the neck-wearing portion are linked at one end portion and are opened at the other end portion.

CITATION LIST

Patent Document

Patent Document 1: JP 2009-213592 A

SUMMARY OF THE INVENTION

Problems to be Solved by the Invention

In Patent Document 1, the presence or absence of a swallowing disorder of whether a swallowing motion is normal or abnormal is evaluated by combining distance information and sound information, but in the actual measurement site, similar motions other than the swallowing motion are included. For this reason, extracting the swallowing motion from the similar motions has not been considered.

Solutions to Problems

As an example of the present invention, a biological information analysis device is configured to include: a swallowing motion assessment unit assessing a motion of a user by analyzing distance information and sound information that are obtaining by measuring a motion and a sound of a pharynx region; and a display unit, in which the swallowing motion assessment unit outputs a first swallowing motion position that is assessed by analyzing the distance information and a second swallowing motion position that is assessed by analyzing the sound information, and the display unit displays the distance information, the sound information, and the first swallowing motion position and the second swallowing motion position that are output by the swallowing motion assessment unit.

Effects of the Invention

According to the present invention, swallowing motion determination can be more accurately performed.

BRIEF DESCRIPTION OF THE DRAWINGS

FIG. 12 is an example of a swallowing motion position assessment result display screen in an example, and is a diagram illustrating a motion discrimination result together with waveform information.

FIG. 13 is a swallowing function classification table showing a swallowing function discrimination method in an example.

MODE FOR CARRYING OUT THE INVENTION

Figure 1:
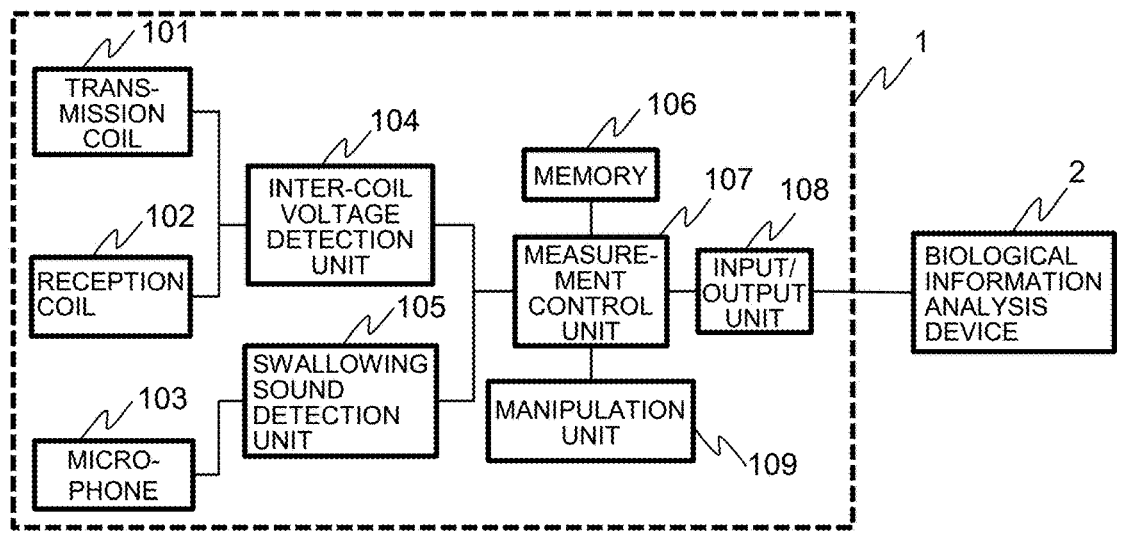
FIG. 1 is a function block diagram of a biological information analysis system in an example.

Hereinafter, examples of the present invention will be described by using the drawings. Note that, in all of the drawings, the same reference numerals will be applied to the same configurations, and the repeated description thereof will be omitted.

Example 1

FIG. 1 is a function block diagram of a biological information analysis system in this example. As illustrated in FIG. 1, the biological information analysis system in this example includes a measurement unit 1 and a biological information analysis device 2.

The measurement unit 1 includes a transmission coil (a laryngeal region displacement detection unit) 101, a reception coil (a laryngeal region displacement detection unit) 102, and a microphone 103 in a flexible retaining tool that is worn by a user at the time in measurement, and a pair of the transmission coil 101 and the reception coil 102 function as a distance information acquisition unit measuring distance information of a laryngeal region displacement that is the motion of the laryngeal region associated with swallowing. The transmission coil 101 and the reception coil 102 are connected to an inter-coil voltage detection unit 104, and an output voltage of the inter-coil voltage detection unit 104 is input to a measurement control unit 107. The microphone 103 (a swallowing sound detection unit) functions as a sound information acquisition unit acquiring sound information of the laryngeal region displacement associated with the swallowing, and for example, a microphone using a piezo element (a piezoelectric element) is preferable since it is difficult to pick up the ambient sound other than the swallowing, and the microphone 103 may be a capacitor type microphone. The microphone 103 is connected to a swallowing sound detection unit 105 and motions as a microphone by receiving power supply or the like. A swallowing sound is output as a voltage from the swallowing sound detection unit 105, and the output voltage is input to the measurement control unit 107.

A memory 106, for example, is a non-volatile memory recording and retaining information that is necessary in the measurement control unit 107, such as a measurement processing program or a characteristic value that is used in the measurement unit 1 and is inherent in hardware. For example, when the measurement unit 1 is powered on, the measurement processing program is loaded to the measurement control unit 107 from the memory 106, and in a case where the measurement processing program is rewritten, the function can be modified or added to the measurement unit 1.

The measurement control unit 107, for example, includes an arithmetic processing device such as a central processing unit (CPU), or a volatile memory, controls the start and the end of the measurement by receiving a signal from a manipulation unit 109 or a control signal from the biological information analysis device 2, or converts a voltage value that is input from the inter-coil voltage detection unit 104 and a voltage value that is input from the swallowing sound detection unit 105 into digital data, records each digital data item once in the memory, reads out the data in a predetermined period, formats the data into a communication data format, and outputs the data to an input/output unit 108. Note that, the communication data format, for example, may be a unique packet format or the like.

The input/output unit 108 is a communication interface performing data transmission/reception with respect to the biological information analysis device 2. A communication method may be based on a general-purpose communication system, and for example, a universal serial bus (USB) cable may be used, or a transmission control protocol (TCP)/ internet protocol (IP) communication format using a network cable, a wireless communication system using Bluetooth (Registered Trademark), and the like may be used.

The manipulation unit 109 is a manipulation interface of the user that is provided in the main body of the measurement unit 1, and buttons suitable for a simple manipulation such as On/Off of the power source or the start and the end of the measurement are suitably arranged.

Note that, the inter-coil voltage detection unit 104, the swallowing sound detection unit 105, the memory 106, the measurement control unit 107, the input/output unit 108, and the manipulation unit 109 are provided in a measurement unit control unit that is separate from the flexible retaining tool.

Figure 2A:
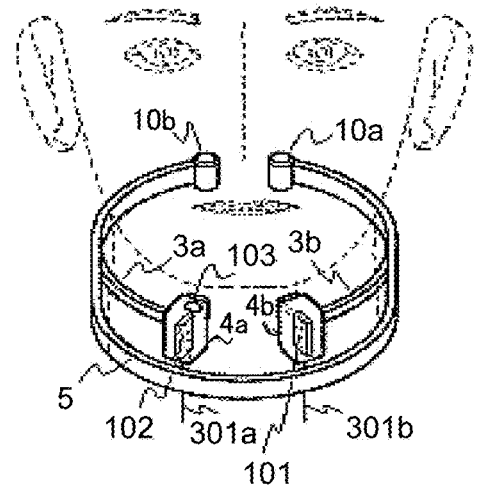
FIG. 2A is an external view of a flexible retaining tool in an example.
Figure 2B:
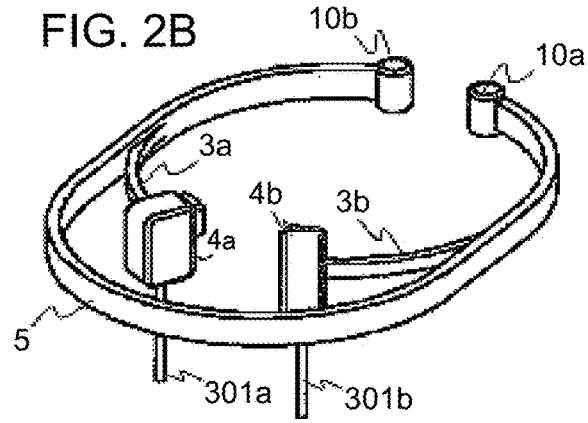
FIG. 2B is a perspective view of FIG. 2A.

FIGS. 2A and 2B are external views illustrating the details of the flexible retaining tool in this example. Here, FIG. 2A is a front view, and FIG. 2B is a perspective view. In FIGS. 2A and 2B, the flexible retaining tool is an independent structure body of a pair of sensor retaining members 3a and 3b and a neck-wearing member 5, and has a structure in which the neck-wearing member 5 and the pair sensor retaining members 3a and 3b are integrally linked such that each of the other ends of the pair sensor retaining members 3a and 3b is retained, and the other ends are opened, and thus, are retained by being mounted on the laryngeal region of a subject.

Sensor units 4a and 4b are arranged on one ends of the pair sensor retaining members 3a and 3b, the laryngeal region displacement detection unit (for example, the transmission coil 101 or the reception coil 102) and the swallowing sound detection unit (for example, the microphone 103) are fixed in the sensor units 4a and 4b, and the other end portions of the sensor retaining members 3a and 3b are integrated with both end portions of the neck-wearing member 5 to be moved and opened following the motion of the thyroid cartilage or the like. In addition, the pair of sensor retaining members 3a and 3b are arranged inside the neck-wearing member 5, both ends of the neck-wearing member and the other ends of the sensor retaining members are integrally linked. The sensor retaining members 3a and 3b can be mounted without being in contact with the neck, and are capable of following a swallowing motion independently from the neck-wearing member 5. Further, the transmission coil 101 or the reception coil 102 and the microphone 103 are arranged on one ends of the pair of sensor retaining members 3a and 3b.

In this example, a magnetic field generated in the transmission coil 101 is detected by the reception coil 102, and a current according to a distance is measured by an electromagnetic induction rule, and thus, the transmission coil 101 and the reception coil 102 are mounted on one ends of the pair of sensor retaining members 3a and 3b such that two coils are arranged to easily face each other (close to a vertical direction of the neck surface), and a high signal-to-noise (SN) ratio can be detected. For this reason, the microphone 103 and the transmission coil 101 or the reception coil 102 can be arranged to be approximately orthogonal to each other, and the mix of a magnetic field noise generated from the microphone 103 with respect to the transmission coil and/or the reception coil can be reduced. Here, the corresponding positions of the transmission coil and the reception coil or the position orthogonal to the microphone are not limited to the above description insofar as the SN ratio is sufficiently excellently detected.

Further, in two terminal portions that are both end portions of the neck-wearing member 5 (portions that are positioned in the back of the neck), neck pressing portions 10a and 10b are formed in the shape of a cylinder, a sphere, and the like. The flexible retaining tool is easily worn on the neck by a total of four pressers of two pressing portions and two sensor units provided on one ends of the sensor retaining member regardless of the size of the neck.

In addition, sensors embedded in the sensor units 4a and 4b are connected to the inter-coil voltage detection unit 104 and the swallowing sound detection unit 105, illustrated in FIG. 1, of the measurement unit control unit (not illustrated), respectively, through wirings 301a and 301b.

According to such a configuration, the measurement unit 1 repeats the acquisition and the transmission of an inter-coil voltage value and a swallowing sound voltage value at a predetermined sampling rate sufficient for the detection of the swallowing motion, from the start to the end of the measurement. For example, in a case where the distance information is acquired at 100 Hz and the sound information is acquired at 4000 Hz, the measurement control unit 107 aggregates one sample of a measurement result of the distance information and 40 samples of a measurement result of the sound information, for example, into one or a plurality of packet data items, and transmits the data, once in 1/100 seconds.

Figure 3:
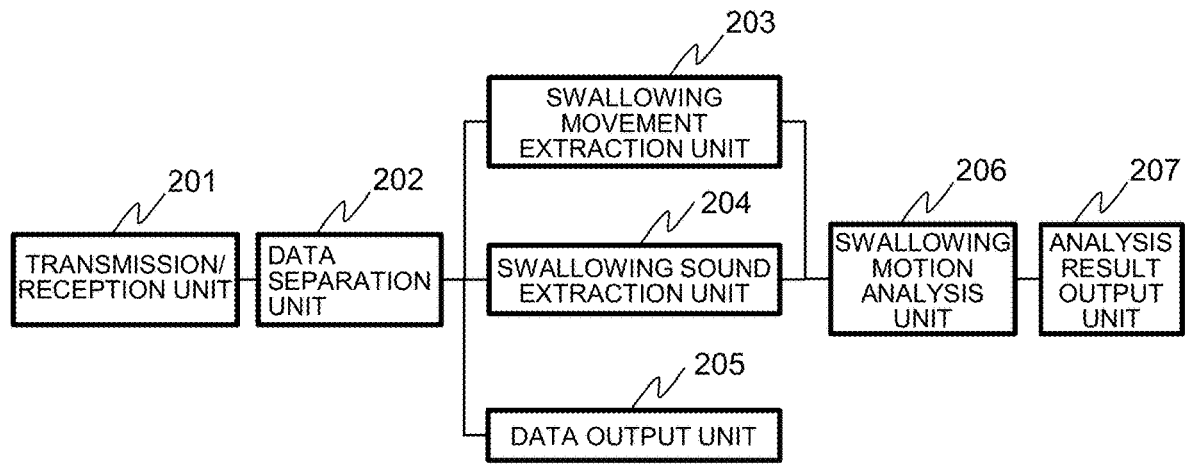
FIG. 3 is a function block diagram of a biological information analysis device in an example.

The biological information analysis device 2 may be an electronic device including an arithmetic processing unit and a memory, such as a general personal computer or a general tablet, and a smart phone, and in FIG. 3, an example of function blocks necessary for the biological information analysis device 2 to detect the swallowing motion are illustrated. Each of the function blocks repeatedly executes the following processing during the execution of the measurement.

In FIG. 3, a transmission/reception unit 201 performs information transmission/reception (the reception of measurement data and the transmission of a control command) in a data communication system and a data format that are defined in advance, together with the measurement unit 1. The received measurement data is sent to a data separation unit 202.

The data separation unit 202 separates inter-coil voltage information and sound voltage information from the received data, transmits the inter-coil voltage information to a swallowing movement extraction unit 203 by converting the inter-coil voltage information into distance data, and transmits the sound voltage information to a swallowing sound extraction unit 204. In addition, the distance data and sound voltage information that are separated are output to a data output unit 205. Note that, the conversion to the distance data from the inter-coil voltage information, for example, may be obtained from a general relational expression of a magnetic force and a distance to which a magnetic amount of a coil to be used is applied, but correction or the like may be performed by recording in advance a voltage value when a inter-coil distance is 0 and a voltage value when the inter-coil distance is a predetermined distance, which has an effect of enabling the distance data to be accurately calculated by the correction.

Note that, as the format when the data is transmitted to the biological information analysis device 2 from the measurement unit 1, for example, the inter-coil voltage information and the sound voltage information may be separately transmitted, and in such a case, when the received data is the inter-coil voltage information, the data separation unit 202 outputs the inter-coil voltage information to the swallowing movement extraction unit 203 by converting the inter-coil voltage information into the distance information, and when the received data is the sound voltage information, the data separation unit 202 outputs the sound voltage information to the swallowing sound extraction unit 204, and thus, both of the data items are output to the data output unit 205.

The swallowing movement extraction unit 203 and the swallowing sound extraction unit 204 are a swallowing motion assessment unit assessing the motion of the user by analyzing the distance information and the sound information. Hereinafter, the details thereof will be respectively described.

Figure 4:
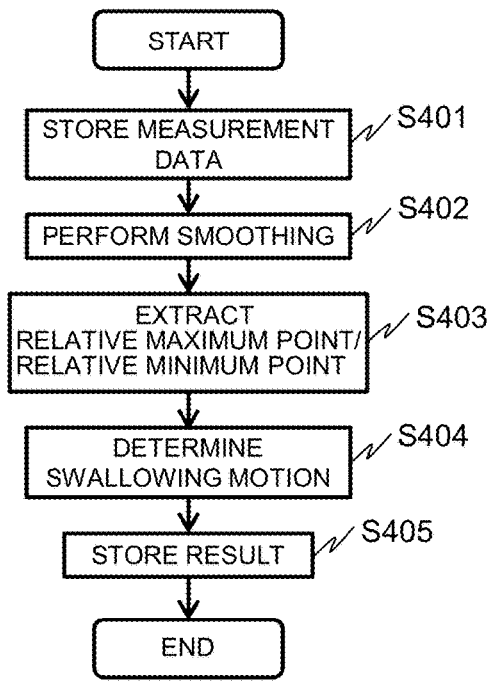
FIG. 4 is a processing flowchart of a swallowing movement extraction unit in an example.
Figure 5:
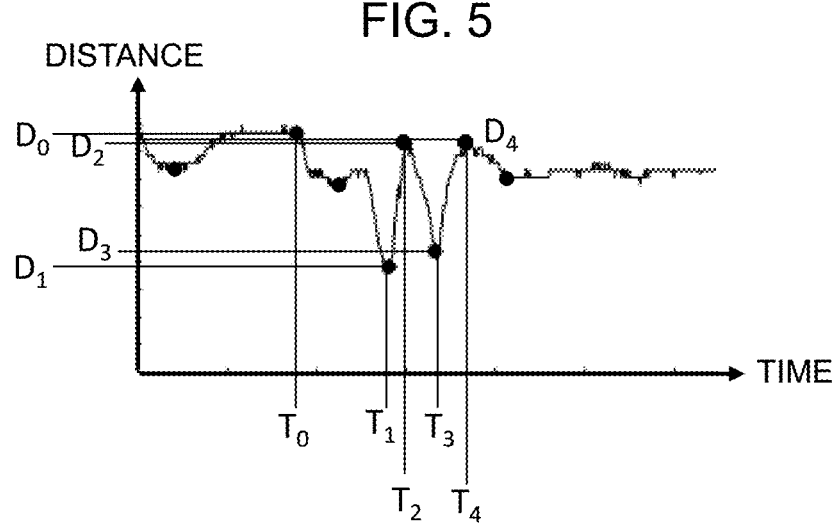
FIG. 5 is a diagram illustrating an example of a change in distance information of a swallowing motion in an example.

The swallowing movement extraction unit 203 performs assessment processing of whether or not the swallowing motion is performed from the distance data exemplified in FIG. 4, during the measurement, and outputs swallowing movement information to a swallowing motion analysis unit 206 in a case where a swallowing motion position is detected. Hereinafter, the assessment processing of a swallowing movement will be described on the basis of FIG. 4 and FIG. 5. Note that, FIG. 5 illustrates an example a change in the distance information of the swallowing motion. Typically, in the distance of the swallowing motion, motions according to three phases of an oral stage, a pharyngeal stage, and an esophageal stage of the swallowing motion appear, and behaviors such as a decrease in a distance from a fixed position, an increase and a decrease, and an increase to return to the fixed position occur. Accordingly, processing of detecting such a "W" shape from the obtained distance data is required.

In FIG. 4, in step (hereinafter, will be abbreviated to S) 401, the swallowing movement extraction unit 203 stores the input distance data in a temporary memory (not illustrated), and the processing proceeds to S402, and in S402, the swallowing movement extraction unit 203 acquires a part of the data recorded in the memory in S401, performs smoothing processing (noise removal), and records the result thereof in the memory again, and the processing proceeds to S403. The smoothing processing, for example, calculates an average value of the latest measurement data items for a predetermined number of times such as five times.

In S403, the swallowing movement extraction unit 203 examines whether the smoothing data calculated in S402 exists at a relative maximum point or at a relative minimum point, and the processing proceeds to S404. For example, when the smoothing data items for latest five times are read out and are arranged in order from the latest value to be expressed as $D[i]$ ($1 \leq i \leq 5$), in a case where $D[3]$ is the maximum value, and relationships of $D[1]<D[2]$ $D[3]$ and $D[3]$ $D[4]>D[5]$ are established, $D[3]$ is set to the relative maximum point, and in a case where $D[3]$ is the minimum value, and relationships of $D[1]>D[2] \geq D[3]$ and $D[3] \leq D[4]$ $<D[5]$ are established, $D[3]$ is set to the relative minimum point. In a case where the relative maximum point or the relative minimum point is obtained, the time and the distance are recorded in the memory. In addition, an inflection point can be acquired from an increase and a decrease in a first-order differential value and a second-order differential value of the smoothing data, and thus, the time and the distance may be recorded in the memory.

In S404, the swallowing movement extraction unit 203 performs the determination of the swallowing motion from the information of the relative maximum point, the relative minimum point, and the inflection point that are obtained in S403, and the distance information when the measurement starts, and the processing proceeds to S405. As illustrated in FIG. 5, relative maximum point information/relative minimum point information (Time, Distance)=$(T_1, D_1)$, $(T_2, D_2)$, and $(T_3, D_3)$ are obtained from a distance waveform, and for example, in a case where a time difference between the respective points (a difference between $T_1$ and $T_2$ and a difference between $T_2$ and $T_3$) is within a range set in advance and a distance difference (a difference between $D_2$ and $D_1$ and a difference between $D_2$ and $D_3$) is greater than a predetermined value set in advance, it is determined that a motion in such a time zone is the swallowing movement. In addition, also with reference to inflection point information, a start point $(T_0, D_0)$ and an end point $(T_4, D_4)$ of the swallowing motion, illustrated in FIG. 5, are obtained. Note that, as a method of searching a W-shaped motion, the relative maximum point and the relative minimum point existing within the set range may be selected as a feature point of the swallowing movement by ignoring a small relative minimum point and a small relative maximum point that are closest from a distance maximum point of the swallowing movement.

In S405, in a case where it is determined that there is the swallowing motion in S404, the swallowing movement extraction unit 203 records a feature amount of the swallowing movement in the memory, and the processing is ended. The feature amount, for example, the information of the time difference between the respective points, a time difference between $T_1$ and $T_3$, the distance difference described above, and the like. As time information of the swallowing movement, the start point and the end point of the motion (in FIG. 5, $(T_0, D_0)$ and $(T_4, D_4)$), the time difference (in FIG. 5, a difference between $T_0$ and $T_1$ and a difference between $T_3$ and $T_4$), or a distance difference (in FIG. 5, a difference between $D_0$ and $D_1$ and a difference between $D_3$ and $D_4$) may be included in the feature amount.

A noticeable W shape as illustrated in FIG. 5 may not be obtained in accordance with individual body characteristics, or a wearing position or a wearing condition of the flexible retaining tool, and thus, a method of discriminating the swallowing motion described above may be adaptable to change. For example, in the above description, the relative minimum point is discriminated as $(T_1, D_1)$ and $(T_3, D_3)$, but the former may be processed by detecting an inflection point that tends to decrease or shifts to elevation from a horizontal state, and the latter may be processed by detecting an inflection point that tends to increase from decrease or shifts to the horizontal state. In addition, for example, a determination value of the time difference or the distance difference described above may be recorded in advance in the memory, in accordance with the individual. In addition, for example, the typical swallowing waveform of the individual (a reference waveform) may be recorded in advance, and similarity between the subsequent measurement result and the reference waveform, for example, may be examined in accordance with a similarity degree detection algorithm of general time-series data such as a mutual correlation function, and thus, a swallowing position may be assessed.

Figure 6:
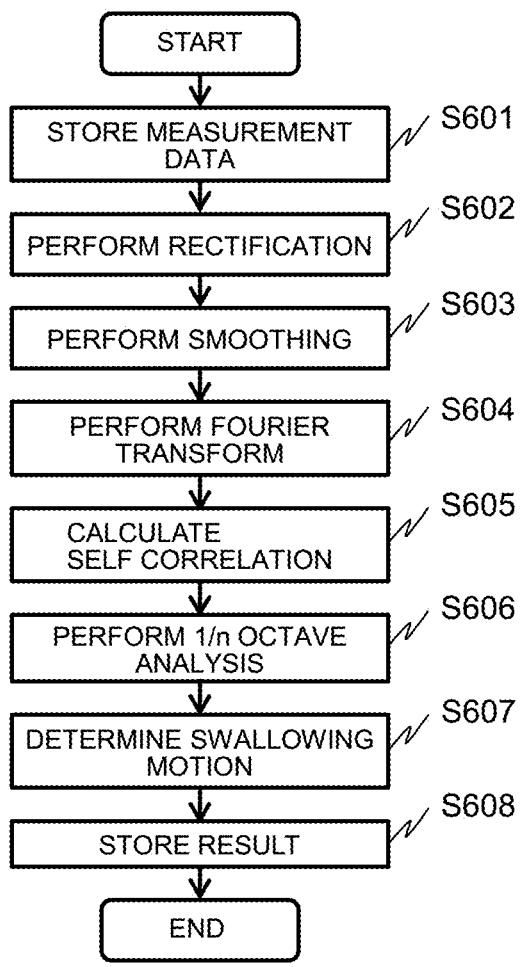
FIG. 6 is a processing flowchart of a swallowing sound extraction unit in an example.

The swallowing sound extraction unit 204 performs assessment of whether or not the swallowing motion is performed by implementing processing illustrated in FIG. 6 with respect to swallowing sound data to be input, and outputs swallowing sound information (records the swallowing sound information in the memory) in a case where the swallowing motion is detected. Hereinafter, an example of the assessment processing will be described on the basis of a sequence diagram illustrated in FIG. 6.

In FIG. 6, in S601, the swallowing sound extraction unit 204 stores the input sound data in the temporary memory (not illustrated), and the processing proceeds to S602. In S602, the swallowing sound extraction unit 204 acquires the data that is recorded in S601, performs rectification processing, and stores a processing result in the memory, and the processing proceeds to S603. The input data, for example, generally includes both positive and negative values such as Minimum Value=−32768 to Maximum Value=32767 in the case of being received as data of 16-bit wide. In the rectification processing, the negative value is converted into the positive value.

In S603, the swallowing sound extraction unit 204 acquires a part of the data that is recorded in the memory in S602, performs smoothing processing, and records a processing result in the memory, and the processing proceeds to S604. In the smoothing processing of the sound data, for example, an average value of the latest measurement data items for a predetermined times such as ten times is calculated. In the case of increasing a data amount to be subjected to smoothing, there is an effect of reducing the influence of a slight noise, but significant acoustic features may be reduced, and thus, a suitable value may be selected in accordance with the properties of a sound recording device.

In S604, the swallowing sound extraction unit 204 acquires a part of the data that is recorded in S601, performs Fourier transform processing, and stores a processing result in the memory. In addition, a frequency value indicating the highest peak excluding an orthogonal component from a Fourier transform result is recorded in the memory, and the processing proceeds to S605. The Fourier transform processing may be performed with respect to the predetermined latest record data by a general method such as discrete Fourier transform (DFT) or fast Fourier transform (FFT). In addition, the Fourier transform processing is implemented over both a short period of time and a long period of time such that a data amount to be subjected to the processing is for 100 milliseconds (100 samples in the case of being recorded at 1000 Hz) and for 500 milliseconds (500 samples in the case of being recorded at 1000 Hz), and thus, parameters with different features can be acquired.

In S605, the swallowing sound extraction unit 204 calculates self correlation information with respect to a Fourier transform processing result that is recorded in S604, and records a processing result in the memory, and the processing proceeds to S606. A self correlation is a method that is generally used in data analysis of a time domain signal or the like in signal processing, but in this method, the self correlation is used for the Fourier transform processing result (a discrete signal Xn). In a case where a self correlation value $R(j)=\Sigma nXnXn-j$ in a lag (frequency difference) j is obtained, and for example, the peak of the Fourier transform processing result appears on a periodic basis at 120 Hz, 180 Hz, 240 Hz, and the like, when the self correlation is calculated, the self correlation value at the lag of 60 Hz and 120 Hz increases. The self correlation information, for example, includes a lag value taking all relative maximum points of the calculated self correlation value.

In S606, the swallowing sound extraction unit 204 performs 1/n octave analysis with respect to the Fourier transform result that is obtained in S604, and records the result in the memory, and the processing proceeds to S607. The 1/n octave analysis is a general analysis method of acoustic data, and in the 1/n octave analysis, data is divided into n frequency bands at a constant ratio, on the basis of 1 kHz, and the total value of components included within each band is obtained. In the case of n=1, a band (an octave band), for example, is divided into 11 to 22 Hz, 22 to 44 Hz, 44 to 88 Hz, 88 to 177 Hz, 177 to 354 Hz, 354 Hz to 707 Hz, and the like. In a case where n increases, a feature amount for each narrower bandwidth is obtained. For example, when the sound data to be input to the swallowing sound extraction unit 204 is at a sampling rate of 1000 Hz, superior frequency conversion data up to 500 Hz is obtained by the Fourier transform, and in the case of n=1, the data amount for each of the bands described above can be calculated, but the last 354 Hz to 707 Hz is a data amount for half the band, and thus, in order to equally evaluate the data amount for each of the bands, for example, a totaling result for the other bands may be divided by 2.

In S607, the swallowing sound extraction unit 204 calculates the swallowing sound information, discriminates the motion from the feature amount included in the swallowing sound information, and records the result in the memory, and the processing proceeds to S608.

Figure 7:
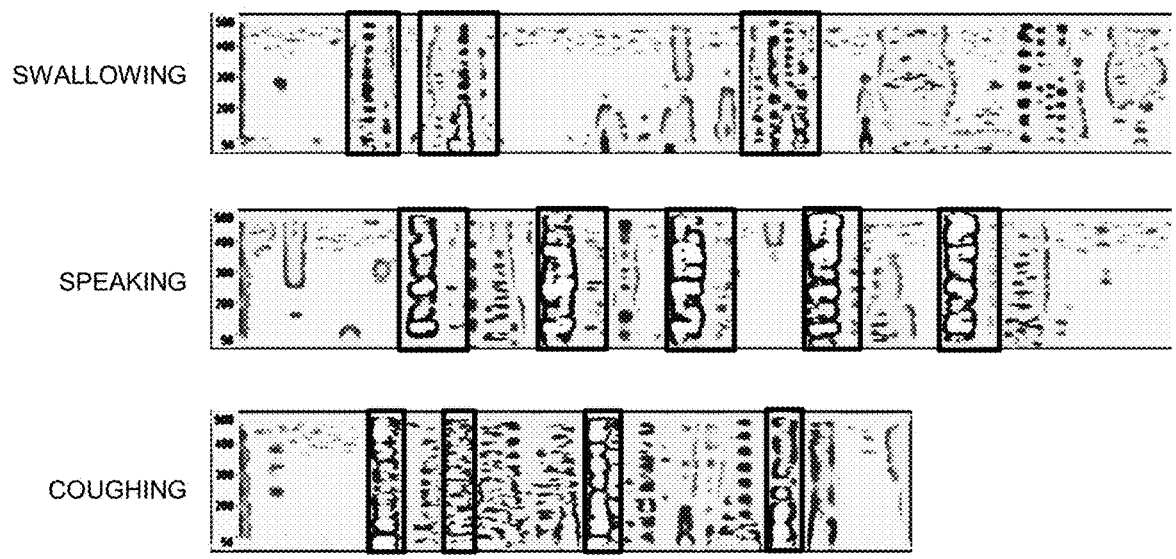
FIG. 7 is a spectrogram of sound information of a swallowing motion, a speaking motion, and a coughing motion that is acquired at a sampling rate of 1000 Hz in an example.

In the discrimination of the motion, FIG. 7 illustrates a spectrogram in which as a Fourier transform result of sound information of a swallowing motion, a speaking motion, and a coughing motion that is acquired at a sampling rate of 1000 Hz, an intensity in each frequency band (a vertical axis) is continuously displayed in accordance with a time axis (a horizontal axis). The intensity is highest in white, and is followed by black and gray. In any case, a portion surrounded by a box-shaped frame is a time zone in which each of the motions is performed. For example, the swallowing motion has a tendency in which an intensity in a comparatively low-frequency range is high, the speaking motion has a tendency in which a stronger and a weaker appear on a periodic basis in a frequency direction, and the coughing motion has a tendency in which a strong peak is generated in a wide band from a low frequency to a high frequency over a short period of time.

Figure 8:
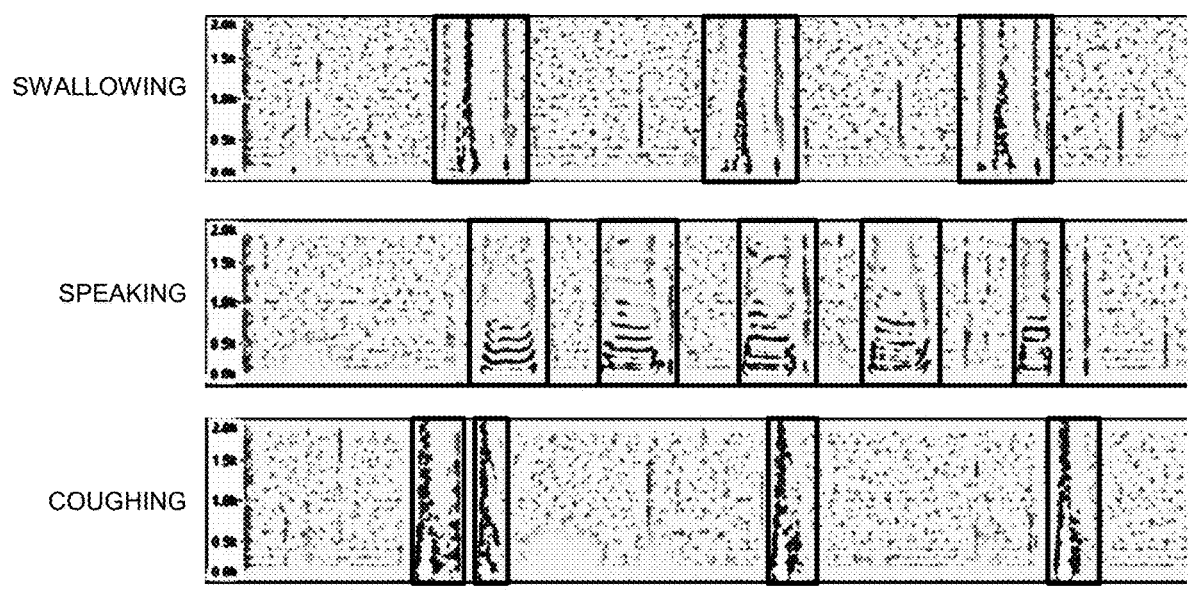
FIG. 8 is a spectrogram of sound information of a swallowing motion, a speaking motion, and a coughing motion that is acquired at a sampling rate of 4000 Hz in an example.

In addition, FIG. 8 illustrates a spectrogram of sound information of a swallowing motion, a speaking motion, and a coughing motion that is acquired at a sampling rate of 4000 Hz and a frame of an implementation time zone of each of the motions. In a case where the sampling rate increases, in the swallowing motion, the separation of the oral stage, the pharyngeal stage, and the esophageal stage (corresponding to the initial stage, the intermediate stage, and the late stage in the frame) is facilitated. That is, as illustrated in FIG. 8, in the swallowing motion, an intensity in a low-frequency range is high in the intermediate stage corresponding to the pharyngeal stage, and a relative ratio of a high frequency component (for example, 1 kHz to 2 kHz) is high in the initial stage and the late stage corresponding to the oral stage and the esophageal stage and is low in the intermediate stage. In the speaking motion, many periodic strongers and weakers appear, compared to FIG. 7. In the coughing motion, as with FIG. 7, a strong peak is generated in a wide band up to approximately 500 Hz.

Figure 9:
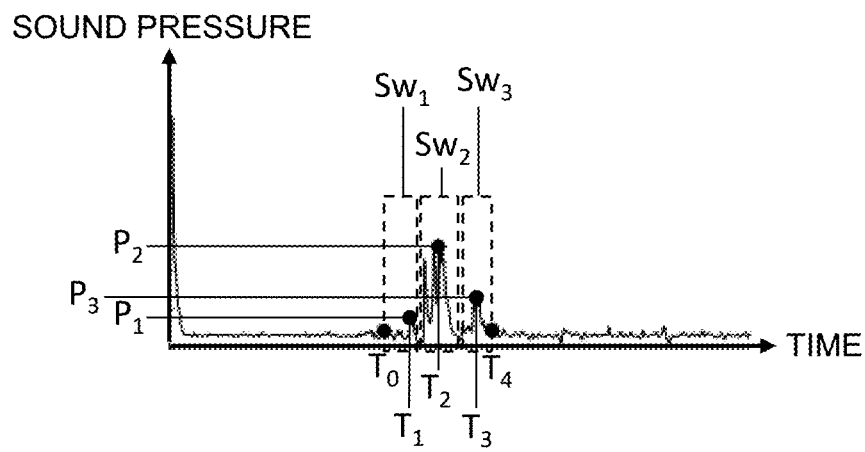
FIG. 9 is a diagram illustrating an example of a change in a sound pressure of a swallowing motion in an example.

In addition, FIG. 9 illustrates an example of a change in a sound pressure of the swallowing motion. FIG. 9 illustrates a result of performing the rectification processing with respect to the input sound data, in which a time is plotted on a horizontal axis, and the sound pressure is plotted on a vertical axis. Typically, the sound pressure of the swallowing motion is separated to three sound sections corresponding to three phases of the oral stage, the pharyngeal stage, and the esophageal stage of the swallowing motion. The sections correspond to time zones $Sw_1$, $Sw_2$, and $Sw_3$ surrounded by a dotted line in FIG. 9, respectively, and a silent section over a short period of time exists between the sound sections. For this reason, in the case of time series, it is determined that the sound sections interposing the silent section over a short period of time therebewteen are a sound generated from a set of motions. Here, for example, it is not necessary to divide the sound pressure into three sections due to the influence of a noise sound, the diversity of the swallowing motion, or the like. An example of a method of discriminating a motion based on such characteristics will be described below.

In a case where the smoothed sound pressure value obtained in S603 of FIG. 6 is less than a predetermined value, it is discriminated that no motions are performed in this section. In a case where the sound pressure value is greater than the predetermined value, it is regarded that some motions are being performed, and motion discrimination is performed by using the feature amount obtained by a set of processings of S602 to S606. For example, the self correlation information includes lag information in a predetermined frequency range (for example, 80 to 200 Hz), and in a case where one lag value and another lag value have approximately doubled relevance, the speaking motion is discriminated. In addition, in a case where the self correlation information does not have such relevance, a case where the sound pressure value is greater than the predetermined value is discriminated as the coughing motion, and a case where a ratio of a data amount in a specific frequency range to the total data amount is greater than a predetermined value is discriminated as the swallowing motion. For example, the discrimination is performed by whether or not the totaling value of calculation results in a low-frequency range (for example, 11 to 22 Hz, 22 to 44 Hz, and 44 to 88 Hz) is greater than or equal to 50% of the total data amount, in the octave analysis results described above. Similarly, the discrimination may be performed by a ratio of a data amount in a specific frequency band in the octave analysis result, and this method may be set in accordance with the sampling rate of the sound data that is recorded or the data amount that is used in the Fourier transform.

In the case of not having any of the features, a motion other than the swallowing, the coughing, and the speaking is discriminated. A discrimination result is recorded in the memory.

When a state in which no motion is performed for a predetermined time continues after a state in which a motion is continuously performed for longer than or equal to a predetermined time, that is, a state in which the smoothed sound pressure is continuously greater than the predetermined value, it is determined that a certain set of motions are completed, and analysis with respect to the set of motions is performed. For example, in a case where the input sound, for example, is at a sufficiently high sampling rate such as 4000 Hz, the transition of a data ratio in a high-frequency range (for example, 1 kHz to 2 kHz) is obtained, it is examined whether or not there is a V-shaped tendency. In addition, for example, an average value of ratios in a low-frequency range within a constant time is calculated. From such analysis information, it is discriminated what the set of motions are. Time-series data of a motion discrimination result is obtained by the processing described above, and thus, for example, a motion that is most frequently discriminated is set to an assessment result of the set of motions. Alternatively, in a case where the number of times that the swallowing motion is discriminated is included in the array of the motion discrimination results at a greater than or equal to a constant ratio, and there is a V-shaped tendency of a data ratio in a high-frequency range, the assessment result may be set to the swallowing motion. Note that, in the determination of the completion of the set of motions, as illustrated in FIG. 9, the silent section over a short period of time that is considered in the swallowing motion may be regarded as a series, and in a case where the silent section over a short period of time is generated greater than or equal to three times, it may be regarded that the set of motions are completed at such a time point.

In S608, in a case where it is discriminated that a set of latest motions are the swallowing motion in S607, the swallowing sound extraction unit 204 records the swallowing sound information in the memory, and the processing is ended. The swallowing sound information, for example, includes a start time of the set of motions (in FIG. 9, $T_0$), an end time (in FIG. 9, $T_4$), a time when the maximum peak is generated (in FIG. 9, $T_2$) and a peak value thereof (in FIG. 9, $P_2$), a time of a first section ($Sw_1$) and a third section ($Sw_3$) and a peak value thereof (in FIG. 9, ($T_1$, $P_1$) and ($T_3$, $P_3$)), and the like. In addition, the time difference (in FIG. 9, the difference between $T_0$ and $T_1$, the difference between $T_1$ and $T_2$, the difference between $T_2$ and $T_3$, and the difference between $T_3$ and $T_4$) may be included in the feature amount.

The data output unit 205 visually presents a measurement data value during the measurement by plotting both of the distance data and the sound data as a waveform on a graph on a display, or auditorially presents the measurement data value by controlling a voice output device such as a speaker and by outputting sound data without processing. Accordingly, an effect of enabling the user wearing the device and a person in the vicinity of the user (for example, a medical service worker, an assistant, or the like) to grasp a progress status of the measurement is obtained.

Figure 10:
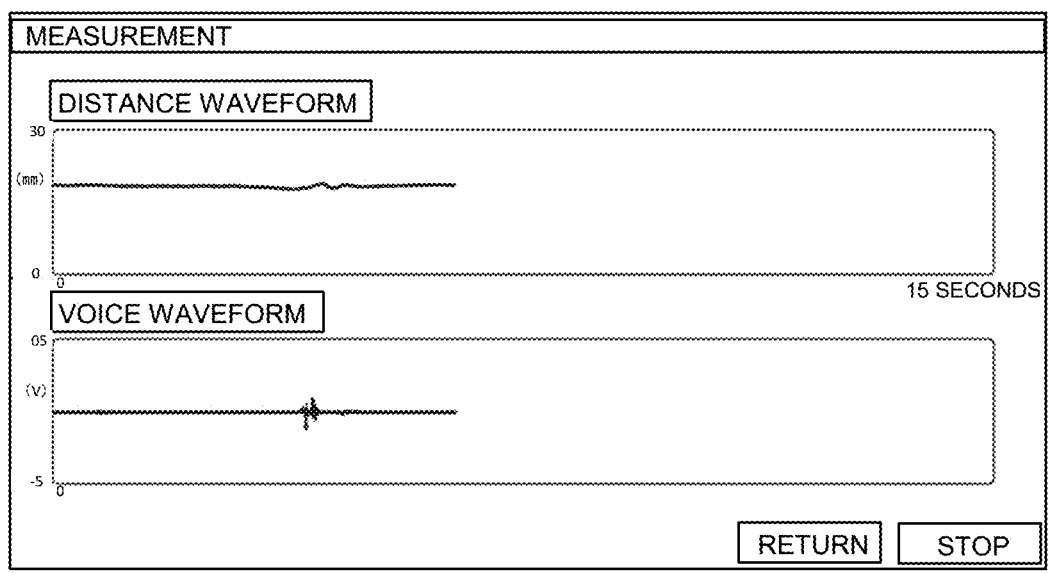
FIG. 10 is an example of screen display during swallowing motion measurement of a data output unit in an example.

FIG. 10 illustrates an example of screen display during swallowing motion measurement of the data output unit 205. In such a display example, an interface is set in which both of the distance data and the sound data are displayed on one screen. According to such display, an effect of enabling simultaneousness between a distance and a sound to be intuitively checked is obtained.

Note that, as another example of a method of displaying the distance data in the data output unit 205, a distance value when the measurement of the distance data is started may be set to a standard scale (for example, "C"), and when there is a motion, a sound of a different scale (for example, in a case where the distance decreases, the scale is lowered, and in a case where the distance increases, the scale is raised) may be output. Accordingly, an effect of enabling the user or the person in the vicinity of the user to sense that there is the swallowing motion and there may be an abnormality by listening a tone different from the usual, depending only on auditory information, is obtained.

The swallowing motion analysis unit 206 performs position assessment with respect to the swallowing motion from the swallowing movement information that is obtained from the swallowing movement extraction unit 203 and the swallowing sound information that is obtained from the swallowing sound extraction unit 204. As an assessment method, for example, a case where a start time and an end time of the swallowing movement information overlap with a start time and an end time of the swallowing sound information is assessed as the swallowing position. A case where there is no swallowing movement information at a time when there is the swallowing sound information may be assessed as the swallowing position even in a case where a reliable swallowing position is not capable of being determined. On the contrary, a case where there is no swallowing sound information at a time when there is the swallowing motion information may not be determined as the swallowing position. Such an assessment method may be determined in accordance with a certainty degree of the determination of each of the movement information and the sound information. The swallowing motion analysis unit 206 determines the position assessment of the swallowing motion and instructs an analysis result output unit 207 to output the result.

Figure 11A:
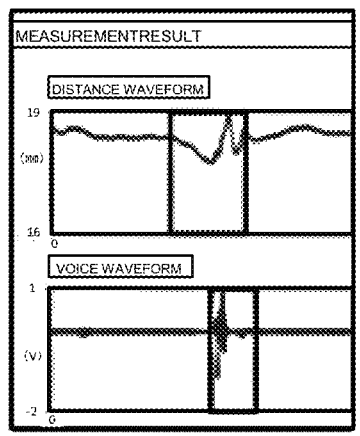
FIG. 11A is a diagram illustrating an example of a swallowing motion position assessment result display screen in an example.
Figure 11B:
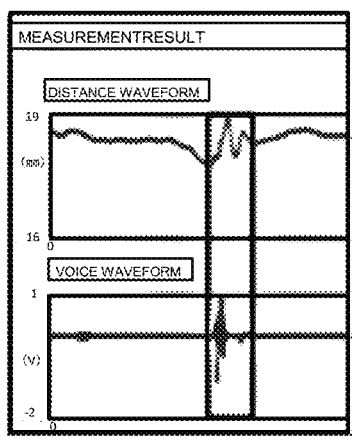
FIG. 11B is a diagram illustrating an example of a swallowing motion position assessment result display screen in an example.
Figure 11C:
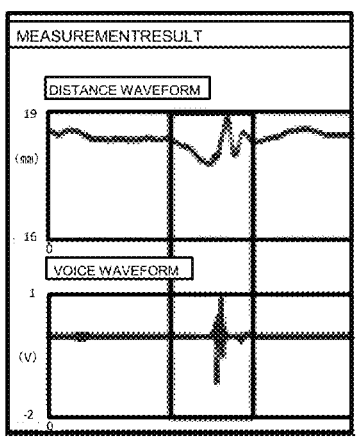
FIG. 11C is a diagram illustrating an example of a swallowing motion position assessment result display screen in an example.

The analysis result output unit 207, for example, displays an analysis result on a display unit that is a display device such as a display or a display screen of a tablet. As a display method, for example, an assessment result of the swallowing motion position is displayed by being superimposed on waveform information as illustrated in FIG. 10. FIGS. 11A, 11B, and 11C are diagrams illustrating an example of a swallowing motion position assessment result display screen in this example. FIG. 11A is a display example in which a rectangle is superimposed on a distance waveform, in accordance with the start time and the end time of the swallowing movement information and a rectangle is superimposed on the voice waveform, in accordance with the start time and the end time of the swallowing sound information. FIG. 11B is a display example in which a rectangle extending over the distance waveform and the voice waveform is superimposed on the distance waveform and the voice waveform, in accordance with the start time and the end time of the swallowing sound information. FIG. 11C is a display example in which a rectangle extending over the distance waveform and the voice waveform is superimposed on the distance waveform and the voice waveform, in accordance with the earlier of the start time of the swallowing movement information and the start time of the swallowing sound information (in this case, the start time of the swallowing movement information) and the later of the end time of the swallowing movement information and the end time of the swallowing sound information (in this case, the end time of the swallowing sound information). In all display examples, there is an effect that it is possible to intuitively grasp a place to be focused. In FIG. 11A, an abnormality can be intuitively recognized from the degree of positional shift between a rectangle position on the distance waveform and a rectangle position on the voice waveform.

In addition, when the measurement for a predetermined time is ended, result display as illustrated in FIG. 12 is performed. FIG. 12 displays the motion discrimination result, in accordance with the waveform information. For example, frames with different lines such as a frame with a solid line in the corresponding positions of the swallowing movement and the swallowing sound, a frame with a broken line in the corresponding position of a speaking sound, and a frame with a dotted line in the corresponding position of a coughing sound are applied to the swallowing motion, the speaking motion, and the coughing motion, respectively, and thus, an effect of more accurately indicating the position of the swallowing motion is obtained. Note that, the color of the frame may be different.

In addition, the feature amount of the swallowing motion that is obtained by the processing illustrated in FIG. 4 and FIG. 6 is displayed as a numerical value. Information of a start point M1, a first relative minimum point M2, a relative maximum point M3, a second relative minimum point M4, and an end point M5 of the swallowing motion (in FIG. 5, information of distances and times corresponding to $(T_0, D_0)$ to $(T_4, D_4)$) is displayed next to the distance waveform, and information of a first peak Ss, a second peak Sm, and a third peak Se of the swallowing sound information (in FIG. 9, information of distances and times corresponding to $(T_1, P_1)$ to $(T_3, P_3)$) is displayed next to the voice waveform. Accordingly, an effect of checking a quantitative value that is difficult to check from a waveform, on a screen, is obtained. Note that, in FIG. 12, in a case where there is a plurality of times of swallowing motion information such that there are a total of three times of the swallowing motions during a measurement time, each feature amount of the swallowing motion that is detected first is displayed in the result screen display. For example, in a case where the user selects a different swallowing motion position on the screen (for example, in the case of a personal computer, a click motion of a mouse, and in the case of a tablet terminal, a tap motion), the swallowing motion position is displayed by being switched into each of the feature amounts of the swallowing motion, and thus, the user is capable of checking all of the feature amounts of the swallowing motion, as necessary. In addition, for example, an average value of the feature amounts of the plurality of times of the swallowing motions may be displayed in the result screen display, and thus, an effect of indicating a comprehensive swallowing result of the user is obtained.

Further, information for evaluating an excellence of the swallowing motion may be displayed, and in FIG. 12, for example, a difference value (M3−Sm) between the time M3 of the relative maximum value of the distance waveform of the swallowing motion information (in FIG. 5, $T_2$) and the time of the second peak Sm of the sound waveform (in FIG. 9, $T_2$), a time (M5−M1) from the start to the end of the swallowing movement (in FIG. 5, a difference between $T_4$ and $T_0$), and a time (M4−M2) from a first relative minimum value to a second relative minimum value (in FIG. 5, a difference between $T_3$ and $T_1$) are collectively displayed. In a case where such calculated values deviate from a normal value stored in advance by greater than or equal to a predetermined value, such calculated values may be displayed by being colored (for example, a red character string). Accordingly, an effect that it is possible to intuitively grasp data to be focused is obtained.

As described above, according to this example, the swallowing motion is accurately sensed, and thus, an effect of enabling the user of this device or a person in the vicinity of the user (for example, a medical service worker or an assistant) to perform quantitative evaluation in real time is obtained.

Note that, the discrimination processing of the swallowing motion in the swallowing sound extraction unit 204 may be a method in which parameters of a voice feature amount are extracted, and then, a motion such as coughing, swallowing, speaking, and mastication is discriminated by the discrimination analysis. For example, the discrimination processing is a method in which a correlation coefficient between each of the motions such as coughing or swallowing and each of the parameters (the smoothed sound pressure value, a peak frequency of the Fourier transform processing data, the data amount in each band of the octave analysis result, and the ratio of the data amount in each frequency range after the 1/n octave analysis) is obtained in advance by using learning data, the possibility (the probability) of each of the motions is calculated from a calculation result of each of the parameters by periodic processing during the implementation of the measurement, and it is assessed that a motion with the highest possibility is to be performed.

In addition, it is not necessary that the analysis of the swallowing sound illustrated in FIG. 6 is performed in this order, and for example, frequency analysis (Fourier transform, self correlation calculation, and 1/n octave analysis) and sound pressure analysis (rectification and smoothing) may be performed in parallel, or the sound pressure analysis may be performed after the frequency analysis is performed first. In addition, in a case where the sound pressure value is sufficiently small at a time point when the sound pressure analysis is implemented, the processing may be ended without implementing the frequency analysis, and thus, an effect of reducing a calculation time or a calculation amount is obtained.

As described above, according to this example, the swallowing motion determination can be more accurately performed.

In addition, the swallowing motion analysis unit 206 may calculate information for aiding the discrimination of the presence or absence of the swallowing disorder and the degree of swallowing disorder, and may output the result by the analysis result output unit 207. FIG. 13 illustrates an example of a guideline that is the standard for the discrimination of the degree of swallowing function disorder. The guideline is roughly classified into four steps including a normal state, and is finely classified into ten steps. Such degree determination is implemented by a medical doctor, but determination based on quantitative data can be aided by the feature amounts of the swallowing movement information and the swallowing sound information that are calculated according to this example and a calculation result using the feature amounts. For example, a possibility that the swallowing function is normal in a case where a difference value between the maximum peak time of the swallowing movement information (in FIG. 5, $T_3$) and a second peak time of the swallowing sound information (in FIG. 9, $T_3$) that are sensing results of the same swallowing motion is less than a predetermined normal determination value, a possibility that the swallowing function is in a mild condition in a case where the difference value is greater than or equal to the predetermined normal determination value and less than a mild condition determination value, and a possibility that the swallowing function is in a moderate condition in a case where the difference value is greater than or equal to the mild condition determination value are collectively represented on the screen. In addition, in a plurality of calculation results, the determination may be performed by the number of values greater than the normal determination value, and for example, it is determined whether or not three values of the difference value of the maximum peak time, the time from the start to the end of the swallowing movement (in FIG. 5, the difference between $T_4$ and $T_0$), the time from the first relative minimum value to the second relative minimum value (in FIG. 5, the difference between $T_3$ and $T_1$) respectively fall within the predetermined normal determination value, and results are collectively represented on the screen such that a possibility that the swallowing function is normal is high in a case where all of the values are normal, a possibility that the swallowing function is in the mild condition is high in a case where one of the values does not fall within the normal determination value, and a possibility that the swallowing function is in the moderate condition is high in a case where two values do not fall within the normal determination value. In addition, the feature amounts include an individual difference, and thus, for example, in a case where a change in the value is greater than or equal to a predetermined ratio, compared to past measurement history of a certain individual, it may be determined that the swallowing function is in the mild condition, and accordingly, an effect of enabling evaluation according to the individual feature is obtained. In addition, a normality degree of the swallowing function is discriminated, and thus, an effect of early detecting a swallowing disorder tendency is obtained.

In addition, the neck-wearing member 5 illustrated in FIG. 2, for example, includes a light emitting display unit such as LED light, and thus, may output the control signal to the measurement unit 1 from the analysis result output unit 207 through the transmission/reception unit 201 such that a measurement state is represented. For example, blue light is emitted during the measurement, and light is emitted in accordance with a discrimination result of a abnormality degree of the swallowing motion (green light in a normal state, yellow light in a mild state, orange light in a moderate state, and red light in a severe state) when the swallowing motion is detected. Accordingly, an effect of enabling the user to grasp the state from a remote position in real time is obtained.

In addition, the set of analysis processings described above are implemented during the data measurement, and thus, the analysis result can be presented to the user in real time, but the biological information analysis device 2 may have a recording function, and for example, records the data received by the transmission/reception unit 201 in a recording medium by associating the data with information of the user, information of the date and time when the measurement is executed, and the like. The recording medium may be a non-volatile medium such as a hard disc drive (HDD) or a solid state drive (SSD). In a case where past recorded measurement data stored in the non-volatile medium is read out, and the set of analysis processings described above are applied, the analysis result can be presented retroactively to the past measurement result, and an effect of enabling comparative verification of the swallowing functions of the past measurement data and the current measurement data is obtained.

Figure 14:
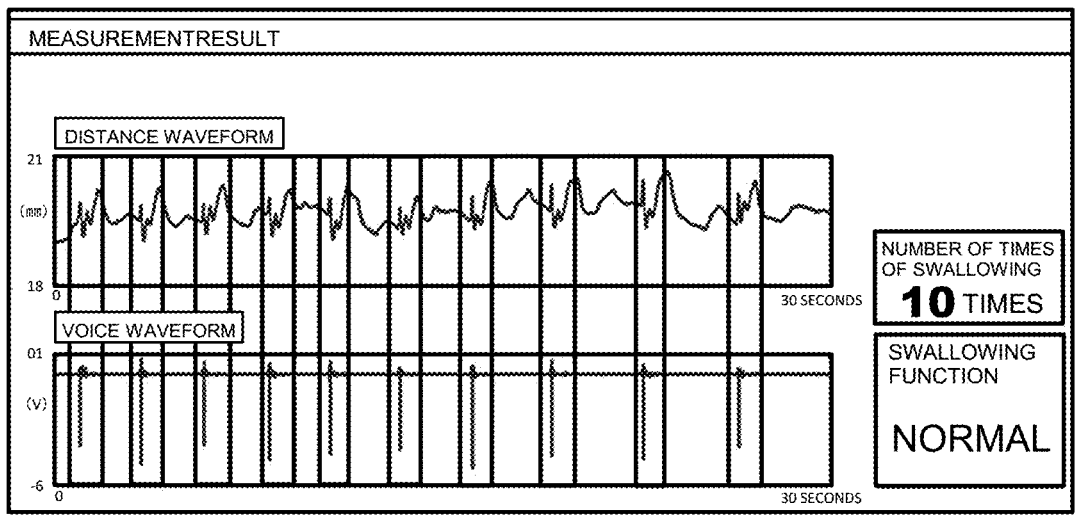
FIG. 14 is a diagram illustrating an example of a number of times of swallowing assessment result display screen in an example.

In addition, as a use case of using the biological information detection device and the biological information detection method, described in this example, in the screening of the swallowing function, in a case where it is measured how many times the swallowing motion can be implemented within a predetermined measurement time (for example, 30 seconds), as a method of displaying a measurement result, evaluation results of the number of times of the swallowing motion and the normality and abnormality of the swallowing function may be displayed together with a position assessment result of the swallowing motion, as illustrated in FIG. 14. Whether or not the swallowing function is normal may be determined by whether or not the number of times of the implementation of the swallowing motion is greater than or equal to a predetermined number of times (for example, three times). In addition, for example, any of the parameters included in the swallowing motion information or the swallowing sound information may be displayed by calculating an average value or a variance value, such as displaying an average value of the times of all swallowing motions. Accordingly, an effect of enabling the quality or the stability of each of the swallowing motions to be quantitatively evaluated together with the evaluation of the number of times of the swallowing motion is obtained.

As described above, according to this example, the swallowing disorder can be simply detected and the result can be displayed.

Note that, the present invention is not limited to the examples described above, and includes various modification examples. For example, in the examples described above, the configuration is described in detail in order to make the present invention easy to understand, and the present invention is not necessarily limited to including all the described configurations. In addition, a part or all of the configurations, the functions, the processors, the processing units, and the like described above, for example, may be designed by an integrated circuit, and thus, the configurations, the functions, the processors, the processing units, and the like may be attained by hardware. In addition, the configurations, the functions, the processors, the processing units, and the like can be attained by software for attaining the functions. Further, a program code of the software for attaining the functions may be distributed through a network, and thus, may be stored in a storage unit such as a hard disk or a memory of a computer or a storage medium such as a CD-RW or a CD-R, and a processor included in the computer may execute the program code by reading out the program code stored in the storage unit or the storage medium.

REFERENCE SIGNS LIST

1 Measurement unit
2 Biological information analysis device
3a, 3b Sensor retaining member
4a, 4b Sensor unit
5 Neck-wearing member
10a, 10b Neck pressing portion
101 Transmission coil
102 Reception coil
103 Microphone
104 Inter-coil voltage detection unit
105 Swallowing sound detection unit
106 Memory
107 Measurement control unit
108 Input/output unit
109 Manipulation unit
201 Transmission/reception unit
202 Data separation unit 203 Swallowing movement extraction unit
204 Swallowing sound extraction unit
205 Data output unit
206 Swallowing motion analysis unit
207 Analysis result output unit

The invention claimed is:

1. A biological information analysis device, comprising:
a swallowing motion assessment unit assessing a swallowing motion of a user by i) measuring a movement and a sound of a pharynx region of the user when the user swallows, ii) generating, based on the measured movement of the pharynx region, distance information representing a displacement of a laryngeal region of the user when the user swallows, and iii) generating, based on the measured sound of the pharynx region, sound information representing a sound of the displacement of the laryngeal region when the user swallows; and
a display unit,
wherein the swallowing motion assessment unit determines the swallowing motion of the user based on a relative maximum point and a relative minimum point in the distance information and outputs i) a first swallowing motion position in time at which a time difference and a distance difference between the relative maximum and minimum points are in a range that satisfies a first predetermined condition and ii) a second swallowing motion position in time at which autocorrelation information of the sound information is in a range that satisfies a second predetermined condition and a 1/n octave analysis is in a range that satisfies a third predetermined condition,
wherein the relative maximum and minimum points represent local peaks and troughs in a waveform of displacement of the laryngeal region,
wherein the display unit displays the distance information, the sound information, the output first swallowing motion position, and the output second swallowing motion position,
wherein the swallowing motion assessment unit assesses, from the distance information, that the first swallowing motion position in time corresponds to a time period including a relative maximum point and two relative minimum points of the displacement of the laryngeal region, wherein a time difference between each adjacent point is within a predetermined range and a distance difference between the relative maximum point and each of the relative minimum points is greater than a predetermined value, and
wherein the swallowing motion assessment unit assesses, from the sound information, that the second swallowing motion position in time corresponds to a time period during which: (i) a ratio of a data amount of frequency components within a predetermined low-frequency range to a total data amount is greater than or equal to a first threshold ratio; (ii) a sound pressure value derived from the sound information exceeds a predetermined threshold; (iii) a self-correlation value calculated from the sound information exhibits a peak at a lag within a predetermined frequency range; and (iv) no lag value within the self-correlation result has a value that is at least twice the value of another lag value within the same range.

2. The biological information analysis device according to claim 1,
wherein the first predetermined condition is a case in which the time difference is within a predetermined range and the distance difference is greater than a predetermined distance value.

3. The biological information analysis device according to claim 1,
wherein the second predetermined condition is that i) the autocorrelation information includes lag information in a specific frequency range, ii) a first lag value and a second lag value in the lag information do not have an approximately doubled relevance, and iii) a ratio of the data amount in the specific frequency range to a total data amount is greater than a predetermined ratio value.

4. The biological information analysis device according to claim 1, wherein the swallowing motion assessment unit
i) performs the measurement of the movement and the sound of the pharynx region using a laryngeal region displacement detection unit and a swallowing sound detection unit that are fixed to a pair of sensor retaining members,
ii) acquires the distance information at a sampling frequency of approximately 100 Hz and the sound information at a sampling frequency of approximately 4000 Hz,
iii) detects a swallowing motion by identifying a waveform pattern in the distance information that includes a decrease, an increase, and a subsequent decrease in displacement corresponding to an oral stage, a pharyngeal stage, and an esophageal stage of a swallowing cycle, and
iv) determines the swallowing motion position based on a time overlap between the first and second swallowing motion positions, or using only the distance information or only the sound information when the corresponding information is unavailable in the other.

5. The biological information analysis device according to claim 1, wherein the display unit superimposes one or more rectangles on waveforms of the distance information and the sound information based on start and end times of the first and second swallowing motion positions to visually indicate the swallowing motion.

6. The biological information analysis device according to claim 1, wherein the swallowing motion assessment unit i) calculates a time difference between a peak in the distance information and a corresponding peak in the sound information, and ii) causes the display unit to output a swallowing function condition selected from normal, mild, and moderate based on whether the time difference falls within a plurality of threshold ranges.

7. A biological information analysis method, comprising:
a swallowing motion assessment step of assessing a motion of a user by i) measuring a movement and a sound of a pharynx region of the user when the user swallows, ii) generating, based on the measured movement of the pharynx region, distance information representing a displacement of a laryngeal region of the user when the user swallows, and iii) generating, based on the measured sound of the pharynx region, sound information representing a sound of the displacement of the laryngeal region when the user swallows; and
a display step,
wherein, in the swallowing motion assessment step, the swallowing motion of the user is determined based on a relative maximum point and a relative minimum point in the distance information,
wherein the relative maximum and minimum points represent local peaks and troughs in a waveform of displacement of the laryngeal region, wherein, in the swallowing motion assessment step, a first swallowing motion position in time at which a time difference and a distance difference between the relative maximum and minimum points are in a range that satisfies a first predetermined condition and a second swallowing motion position in time at which autocorrelation information of the sound information is in a range that satisfies a second predetermined condition and a 1/n octave analysis is in a range that satisfies a third predetermined condition are output, wherein, in the display step, the distance information, the sound information, and the output first swallowing motion position and the output second swallowing motion position are displayed, wherein, in the swallowing motion assessment step, the first swallowing motion position in time is assessed, from the distance information, as a time period including a relative maximum point and two relative minimum points of the displacement of the laryngeal region, wherein a time difference between each adjacent point is within a predetermined range and a distance difference between the relative maximum point and each of the relative minimum points is greater than a predetermined value, and wherein, in the swallowing motion assessment step, the second swallowing motion position in time is assessed, from the sound information, as a time period during which: (i) a ratio of a data amount of frequency components within a predetermined low-frequency range to a total data amount is greater than or equal to a first threshold ratio; (ii) a sound pressure value derived from the sound information exceeds a predetermined threshold; (iii) a self-correlation value calculated from the sound information exhibits a peak at a lag within a predetermined frequency range; and (iv) no lag value within the self-correlation result has a value that is at least twice the value of another lag value within the same range.

8. The biological information analysis method according to claim 7,
wherein the first predetermined condition is a case in which the time difference is within a predetermined range and the distance difference is greater than a predetermined distance value.

9. The biological information analysis method according to claim 7,
wherein the second predetermined condition is that i) the autocorrelation information includes lag information in a specific frequency range, ii) a first lag value and a second lag value in the lag information do not have an approximately doubled relevance, and iii) a ratio of the data amount in the specific frequency range to a total data amount is greater than a predetermined ratio value.

10. The biological information analysis method according to claim 7, wherein the swallowing motion assessment step includes:
  i) performing the measurement of the movement and the sound of the pharynx region using a laryngeal region displacement detection unit and a swallowing sound detection unit that are fixed to a pair of sensor retaining members;
  ii) acquiring the distance information at a sampling frequency of approximately 100 Hz and acquiring the sound information at a sampling frequency of approximately 4000 Hz;
  iii) identifying a waveform in the distance information having a decrease, an increase, and a subsequent decrease in displacement that correspond to an oral stage, a pharyngeal stage, and an esophageal stage of a swallowing motion; and
  iv) determining the swallowing motion position based on an overlap in time between the first swallowing motion position and the second swallowing motion position, or using only the distance information or only the sound information when the other is unavailable.

11. The biological information analysis method according to claim 7, wherein the display step includes superimposing one or more rectangles on waveforms of the distance information and the sound information based on start and end times of the first and second swallowing motion positions.

12. The biological information analysis method according to claim 7, further comprising a swallowing function evaluation step that includes i) calculating a time difference between a peak in the distance information and a corresponding peak in the sound information and ii) outputting, via the display step, a swallowing function condition selected from among normal, mild, and moderate, based on whether the time difference falls within one of a plurality of predetermined threshold ranges.

13. A biological information analysis system, comprising:
a measurement unit; and
a biological information analysis device,
wherein the measurement unit includes i) a distance information acquisition unit acquiring distance information representing a displacement of a laryngeal region of a user when the user swallows by measuring a movement of a pharynx region of the user when the user swallows and ii) a sound information acquisition unit acquiring sound information representing a sound of the displacement of the laryngeal region when the user swallows by measuring a sound corresponding to the motion of the pharynx region,
wherein the biological information analysis device includes i) a swallowing motion assessment unit assessing a swallowing motion of the user based on the distance information and the sound information and ii) a display unit,
wherein the swallowing motion assessment unit determines the swallowing motion of the user based on a relative maximum point and a relative minimum point in the distance information and outputs i) a first swallowing motion position in time at which a time difference and a distance difference between the relative maximum and minimum points are in a range that satisfies a first predetermined condition and a second swallowing motion position in time at which autocorrelation information of the sound information is in a range that satisfies a second predetermined condition and a 1/n octave analysis is in a range that satisfies a third predetermined condition,
wherein the relative maximum and minimum points represent local peaks and troughs in a waveform of displacement of the laryngeal region,
wherein the display unit displays the distance information, the sound information, the output first swallowing motion position and the output second swallowing motion position,
wherein the swallowing motion assessment unit assesses, from the distance information, that the first swallowing motion position in time corresponds to a time period including a relative maximum point and two relative minimum points of the displacement of the laryngeal region, wherein a time difference between each adjacent point is within a predetermined range and a distance difference between the relative maximum point and each of the relative minimum points is greater than a predetermined value, and wherein the swallowing motion assessment unit assesses, from the sound information, that the second swallowing motion position in time corresponds to a time period during which: (i) a ratio of a data amount of frequency components within a predetermined low-frequency range to a total data amount is greater than or equal to a first threshold ratio; (ii) a sound pressure value derived from the sound information exceeds a predetermined threshold; (iii) a self-correlation value calculated from the sound information exhibits a peak at a lag within a predetermined frequency range; and (iv) no lag value within the self-correlation result has a value that is at least twice the value of another lag value within the same range.

14. The biological information analysis system according to claim 13, wherein the first predetermined condition is a case in which the time difference is within a predetermined range and the distance difference is greater than a predetermined distance value.

15. The biological information analysis system according to claim 13, wherein the second predetermined condition is that i) the autocorrelation information includes lag information in a specific frequency range, ii) a first lag value and a second lag value in the lag information do not have an approximately doubled relevance, and iii) a ratio of the data amount in the specific frequency range to a total data amount is greater than a predetermined ratio value.

16. The biological information analysis system according to claim 13, wherein the measurement unit includes a laryngeal region displacement detection unit and a swallowing sound detection unit that are fixed to a pair of sensor retaining members to perform the measurement of the movement and the sound of the pharynx region, wherein the distance information acquisition unit acquires the distance information at a sampling frequency of approximately 100 Hz, and the sound information acquisition unit acquires the sound information at a sampling frequency of approximately 4000 Hz, wherein the swallowing motion assessment unit identifies a waveform in the distance information including a decrease, an increase, and a subsequent decrease in displacement corresponding to an oral stage, a pharyngeal stage, and an esophageal stage of a swallowing motion, and wherein the swallowing motion assessment unit determines the swallowing motion position based on a time overlap between the first swallowing motion position and the second swallowing motion position, or using only the distance information or only the sound information when the other is unavailable.

17. The biological information analysis system according to claim 13, wherein the display unit superimposes one or more rectangles on waveforms of the distance information and the sound information based on start and end times of the first and second swallowing motion positions.

18. The biological information analysis system according to claim 13, wherein the swallowing motion assessment unit calculates a time difference between a peak in the distance information and a corresponding peak in the sound information, and wherein the display unit outputs a swallowing function condition selected from among normal, mild, and moderate, based on whether the time difference falls within one of a plurality of predetermined threshold ranges.

* * * * *